United States Patent
Rozas (10) Patent No.: US 9,323,315 B2
(45) Date of Patent: Apr. 26, 2016

(54) METHOD AND SYSTEM FOR AUTOMATIC CLOCK-GATING OF A CLOCK GRID AT A CLOCK SOURCE

(75) Inventor: Guillermo Juan Rozas, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 280 days.

(21) Appl. No.: 13/586,517

(22) Filed: Aug. 15, 2012

(65) Prior Publication Data

US 2014/0053008 A1 Feb. 20, 2014

(51) Int. Cl.
| | |
|---|---|
| G06F 1/26 | (2006.01) |
| G06F 1/32 | (2006.01) |
| G06F 9/38 | (2006.01) |
| G06F 11/07 | (2006.01) |
| G06F 11/30 | (2006.01) |

(52) U.S. Cl.
CPC ............ *G06F 1/3237* (2013.01); *G06F 1/3228* (2013.01); *G06F 9/3824* (2013.01); *G06F 9/3869* (2013.01); *G06F 11/0706* (2013.01); *G06F 11/0751* (2013.01); *G06F 11/0793* (2013.01); *G06F 11/3024* (2013.01); *G06F 2201/87* (2013.01); *G06F 2201/88* (2013.01); *Y02B 60/1221* (2013.01)

(58) Field of Classification Search
CPC ... G06F 1/3228; G06F 1/3237; G06F 1/3243; G06F 9/3867; Y02B 60/1221; Y02B 60/1239
USPC .................. 713/300, 320, 322, 601
See application file for complete search history.

(56) References Cited

U.S. PATENT DOCUMENTS

| | | | |
|---|---|---|---|
| 5,643,086 A | 7/1997 | Alcorn et al. | |
| 5,752,062 A | 5/1998 | Gover et al. | |
| 5,757,919 A | 5/1998 | Herbert et al. | |
| 5,815,154 A | 9/1998 | Hirschtick et al. | |
| 5,892,904 A | 4/1999 | Atkinson et al. | |
| 5,920,725 A | 7/1999 | Ma et al. | |
| 5,933,627 A * | 8/1999 | Parady .......................... | 712/228 |
| 5,970,147 A | 10/1999 | Davis | |
| 5,978,484 A | 11/1999 | Apperson et al. | |
| 5,999,737 A | 12/1999 | Srivastava | |
| 6,016,474 A | 1/2000 | Kim et al. | |
| 6,157,618 A | 12/2000 | Boss et al. | |
| 6,226,756 B1 * | 5/2001 | Mueller ........................ | 713/500 |
| 6,233,690 B1 * | 5/2001 | Choi et al. ................... | 713/322 |
| 6,266,416 B1 | 7/2001 | Sigbjoernsen et al. | |

(Continued)

FOREIGN PATENT DOCUMENTS

| | | |
|---|---|---|
| DE | 102011102238 | 12/2011 |
| GB | 2481492 | 12/2011 |

OTHER PUBLICATIONS gDEBugger, graphicREMEDY, http://www.gremedy.com Jul. 29, 2005.

(Continued)

*Primary Examiner* — Mark Connolly (57) ABSTRACT

A system and method for power management by performing clock-gating at a clock source. In the method a critical stall condition is detected within a clocked component of a core of a processing unit. The core includes one or more clocked components synchronized in operation by a clock signal distributed by a clock grid. The clock grid is clock-gated to suspend distribution of the clock signal to the core during the critical stall condition.

18 Claims, 5 Drawing Sheets

400

410
DETECTING A CRITICAL STALL CONDITION WITHIN A CLOCKED COMPONENT OF A CORE OF A PROCESSING UNIT, WHEREIN THE CORE COMPRISES ONE OR MORE CLOCKED COMPONENTS SYNCHRONIZED IN OPERATION BY A CLOCK SIGNAL DISTRIBUTED BY A CLOCK GRID

420
CLOCK GATING THE CLOCK GRID TO SUSPEND DISTRIBUTION OF THE CLOCK SIGNAL TO THE CORE DURING THE CRITICAL STALL CONDITION (56) References Cited

U.S. PATENT DOCUMENTS

| | | | |
|---|---|---|---|
| 6,330,008 B1 | 12/2001 | Razdow et al. | |
| 6,362,825 B1 | 3/2002 | Johnson | |
| 6,412,039 B1 | 6/2002 | Chang | |
| 6,535,905 B1* | 3/2003 | Kalafatis et al. | 718/108 |
| 6,668,325 B1 | 12/2003 | Collberg et al. | |
| 6,684,389 B1 | 1/2004 | Tanaka et al. | |
| 6,732,060 B1 | 5/2004 | Lee | |
| 6,901,582 B1 | 5/2005 | Harrison | |
| 6,943,800 B2 | 9/2005 | Taylor et al. | |
| 6,965,994 B1 | 11/2005 | Brownell et al. | |
| 7,016,972 B2 | 3/2006 | Bertram et al. | |
| 7,047,519 B2 | 5/2006 | Bates et al. | |
| 7,095,416 B1 | 8/2006 | Johns et al. | |
| 7,107,484 B2 | 9/2006 | Yamazaki et al. | |
| 7,173,635 B2 | 2/2007 | Amann et al. | |
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |
| 7,401,116 B1 | 7/2008 | Chalfin et al. | |
| 7,401,242 B2 | 7/2008 | Abernathy et al. | |
| 7,420,563 B2 | 9/2008 | Wakabayashi | |
| 7,505,953 B2 | 3/2009 | Doshi | |
| 7,555,499 B2 | 6/2009 | Shah et al. | |
| 7,627,730 B1 | 12/2009 | Moll | |
| 7,765,500 B2 | 7/2010 | Hakura et al. | |
| 7,778,800 B2 | 8/2010 | Aguaviva et al. | |
| 7,891,012 B1 | 2/2011 | Kiel et al. | |
| 8,055,871 B1 | 11/2011 | Schulze et al. | |
| 8,108,810 B2 | 1/2012 | Hoe et al. | |
| 8,448,002 B2 | 5/2013 | Bulusu et al. | |
| 8,656,198 B2 | 2/2014 | Branover et al. | |
| 8,850,371 B2 | 9/2014 | Sprinkle | |
| 9,104,421 B2 | 8/2015 | Ahmad et al. | |
| 2001/0034835 A1 | 10/2001 | Smith | |
| 2001/0044928 A1 | 11/2001 | Akaike et al. | |
| 2002/0133784 A1 | 9/2002 | Gupta et al. | |
| 2002/0157086 A1 | 10/2002 | Lewis et al. | |
| 2002/0175839 A1 | 11/2002 | Frey | |
| 2003/0043022 A1 | 3/2003 | Burgan et al. | |
| 2003/0120935 A1 | 6/2003 | Teal et al. | |
| 2003/0208723 A1 | 11/2003 | Killian et al. | |
| 2003/0214660 A1 | 11/2003 | Plass et al. | |
| 2004/0085894 A1 | 5/2004 | Wang et al. | |
| 2004/0130552 A1 | 7/2004 | Duluk, Jr. et al. | |
| 2004/0158806 A1 | 8/2004 | Scheffer | |
| 2004/0158824 A1 | 8/2004 | Gennip et al. | |
| 2004/0162989 A1 | 8/2004 | Kirovski | |
| 2005/0198051 A1 | 9/2005 | Marr et al. | |
| 2005/0222881 A1 | 10/2005 | Booker | |
| 2005/0243094 A1 | 11/2005 | Patel et al. | |
| 2005/0273652 A1 | 12/2005 | Okawa et al. | |
| 2005/0278684 A1 | 12/2005 | Hamilton et al. | |
| 2006/0047958 A1 | 3/2006 | Morais | |
| 2006/0079333 A1 | 4/2006 | Morrow et al. | |
| 2006/0080625 A1 | 4/2006 | Bose et al. | |
| 2006/0109846 A1 | 5/2006 | Lioy et al. | |
| 2006/0161761 A1 | 7/2006 | Schwartz et al. | |
| 2006/0185017 A1 | 8/2006 | Challener et al. | |
| 2007/0074059 A1* | 3/2007 | Abernathy et al. | 713/500 |
| 2007/0115292 A1 | 5/2007 | Brothers et al. | |
| 2007/0274284 A1 | 11/2007 | Dendukuri et al. | |
| 2008/0007563 A1 | 1/2008 | Aronson et al. | |
| 2008/0095090 A1 | 4/2008 | Lee et al. | |
| 2010/0077184 A1* | 3/2010 | Lofgren et al. | 712/219 |
| 2010/0250972 A1 | 9/2010 | Freitas | |
| 2011/0320839 A1 | 12/2011 | David et al. | |
| 2013/0311797 A1* | 11/2013 | Ahmad et al. | 713/310 |

OTHER PUBLICATIONS

A Relational Debugging Engine for the Graphics Pipeline, Duca et al., http://citeseer.ist.psu.edu/cache/papers/ cs2/167/http:zSZzSzwww.cs.jhu.eduzSz~cohensSzPublicationszSzgldb.pdf/a-relational-debugging-engine.pdf International Conference on Computer Graphics and Interactive Techniques, ACM SIGGRAPH 2005, pp. 453-463, LA, ISSN: 0730-0301.

"maxVUE Graphic Editor", Metso Automation, 2005, pp. 1-6, http://www.metsoautomation.com/automation/indes.nsf/FR?Readform &ATL=automation/ed_prod.nsf/WebWID/WTB-041110-22256F-2445A.

"ATI Radeon X800, 3D Architecture White Paper", ATI, 2005, pp. 1-13, with proof of seniority (4pages), according to ACM bibliography regarding the document: "The Direct3D 10 system", ACM TOG, vol. 25, Iss.3 (Jul. 2006), Reference 1.

N. Tatarchuk, "New RenderMonkey Features for DirectX and OpenGL Shader Development", Game Developers Conference, Mar. 2004.

C. Cebenoyan and M. Wloka, "Optimizing The Graphics Pipeline", 2003, Nvidia GDC Presentation Slide.

gDEBugger, graphicREMEDY, http://www.gremedy.com/ Aug. 8, 2006.

Josh Lessard, "Profiling Concurrent Programs Using Hardware Counters", May 2005, University Of Waterloo, Thesis.

Dror G. Feitelson and Larry Rudolph, "Toward Convergence In A Job Scheduling for Parallel Supercomputers", Aug. 1996, Springer, Job Scheduling Strategies for Parallel Proceedings: IPPS '96 workshop Honolulu, Hawaii, Apr. 16, 1996 proceedings.

Jeffrey K. Hollingsworth and Barton P. Miller, "Dynamic Control of Performance Monitoring On Large Scale Parallel System", Jul. 23, 1993, ACM, "International Conference On Supercomputing" Proceedings of the 7th International Conference on Supercomputing, pp. 185-194.

* cited by examiner

METHOD AND SYSTEM FOR AUTOMATIC CLOCK-GATING OF A CLOCK GRID AT A CLOCK SOURCE

BACKGROUND

High-frequency micro-processors, and other computing engines, often use a clock grid (instead of a clock tree) as the global clock distribution mechanism to reduce clock uncertainty and make more of the nominal clock cycle available for computation.

On the one hand, when a clock tree is used for clock distribution, large parts of the global clock distribution network can be gated relatively easily, thereby largely eliminating global clock distribution (active/dynamic) power in a relatively local manner.

However, on the other hand clock grids are not easily gated when compared to clock trees, for purposes of power management. Although clock grids have a frequency advantage and hence a conceptual energy efficiency advantage when active, clock grids have some power draw backs when the micro-processor is inactive, such as, when waiting for information from memory without which the processor cannot continue. That is, power is consumed, in part, by the distribution of the clock and by the processor circuitry.

Clock grids rely on their being globally 'on' to reduce skew. Due to their configuration, traditional clock-gating is forced to clock-gate closer to the 'leaves' than is possible when using a clock tree. Since the grid typically has more capacitance and transistors than the corresponding spanning tree, more power potentially is consumed and/or wasted for circuits clocked by a clock grid. In such inactive situations, the global clock grid can consume hundreds of milliwatts even if all of the units are locally clock-gated, yet the processor still cannot make forward progress due to the nature of such a miss to memory or equivalent stalling condition.

In some situations, a clock grid may be managed using power management software control. For instance, for limited critical conditions, the active clock power of the clock grid is handled by using explicit software power-management instructions and sequences. For instance, power management through software control may be achieved by explicitly entering lower-power states under software control. The software controlled lower power states can gate the clock grid at the source.

However, a software controlled power management solution does not help with saving power under dynamic and/or critical conditions, as the software is unable to identify in a timely manner when the critical condition exists. For instance, a software controlled management solution is unable to determine when an instruction branch is going to mis-predict and then search for the proper instruction and/or data in lower level caches or the underlying memory system.

SUMMARY

A method and system for performing power management are disclosed. The method includes performing clock-gating at a clock source. In particular, a critical stall condition is detected within a hardware based clocked component of a core of a processing unit. The core includes one or more clocked components synchronized in operation by a clock signal distributed by a clock grid. The clock grid is clock-gated at a root branch supplying the clock signal to the core to suspend distribution of the clock signal throughout the core during the critical stall condition.

In another embodiment, another method for power management is disclosed. The method includes detecting when an instruction is sent from a clocked component of a core of a processing unit. The instruction is associated with a response, wherein the processing of data in the core is suspended or inactive pending the receipt of the response. In some instances, the response is returned from the memory system. The core includes one or more clocked components synchronized in operation by a clock signal distributed by a clock grid. The method includes starting a counter. The counter is incremented, such as, incrementing the counter by one for every clock cycle. Transactions are monitored for the response. For instance, transactions from a memory system are monitored for the response to the instruction. The method includes determining when the counter reaches a threshold before the response is detected. If the counter reaches the threshold before the detection of the response, the method includes clock-gating the clock grid to suspend distribution of the clock signal to the core during the critical stall condition.

In still another embodiment, an apparatus for power management is disclosed. The apparatus includes a clock source for providing a clock signal. The apparatus also includes a clock grid for distributing the clock signal to a core of a processing unit. The core includes one or more clocked components synchronized in operation by the clock signal. A hardware based monitor is included for detecting a critical stall condition within a clocked component of the core. The clocked component comprises the hardware based monitor, in one embodiment. The apparatus includes a clock-grid control unit for clock-gating the clock grid at a root branch of the clock grid to suspend distribution of the clock signal throughout the core during the critical stall condition. The root branch distributes the clock signal to the core.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "determining," "monitoring," "gating," or the like, refer to actions and processes (e.g., flowcharts 400 and 500 of FIGS. 4 and 5, respectively) of a computer system or similar electronic computing device or processor (e.g., system 100 of FIG. 1 and micro-architecture 300 of FIG. 3). The computer system or similar electronic computing device manipulates and transforms data represented as physical (electronic) quantities within the computer system memories, registers or other such information storage, transmission or display devices.

Figure 4:
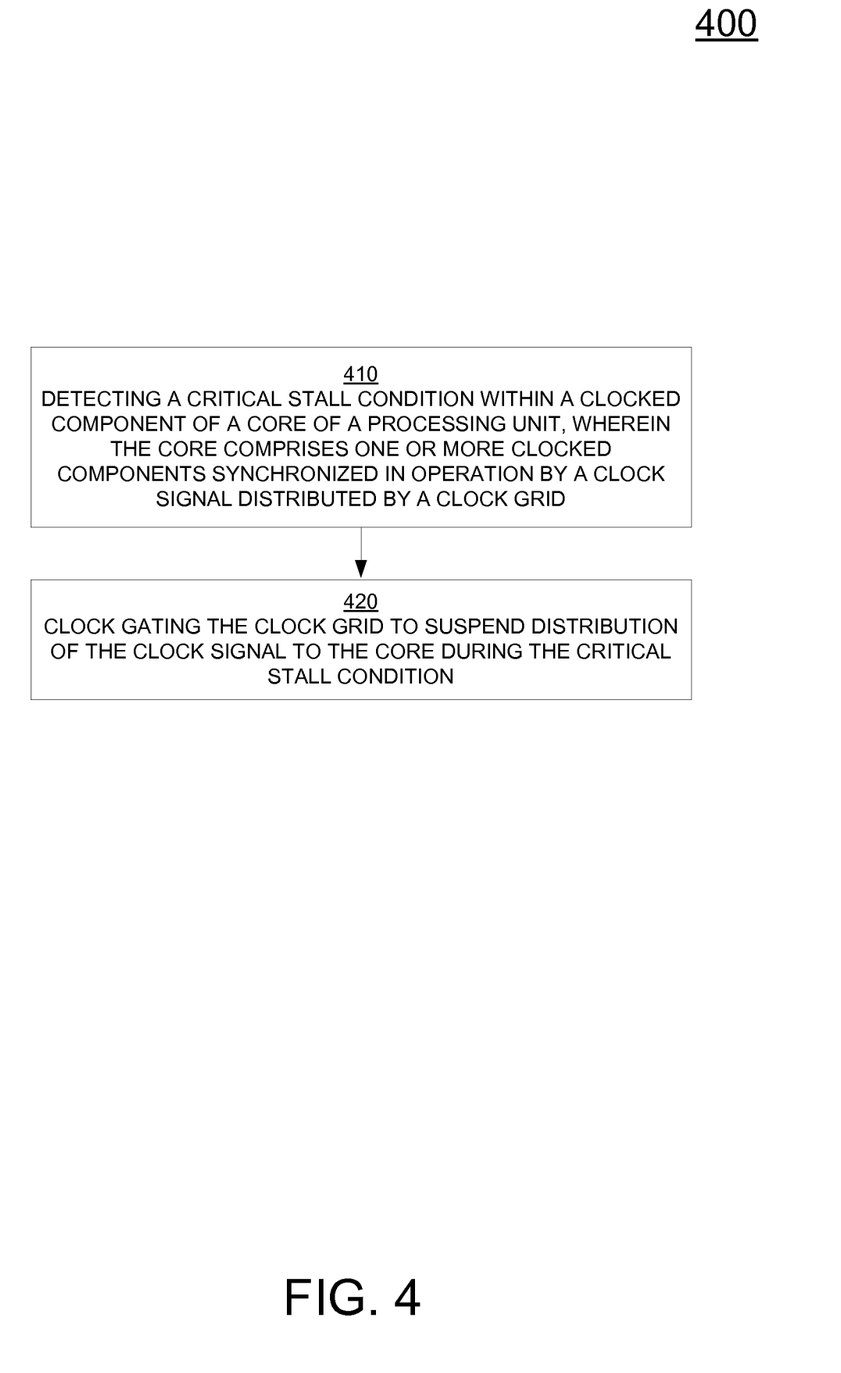
FIG. 4 is a flow diagram illustrating a method for performing power management by clock-gating a clock source to suspend distribution of a clock signal when a critical stall condition is detected, in accordance with one embodiment of the present disclosure.
Figure 5:
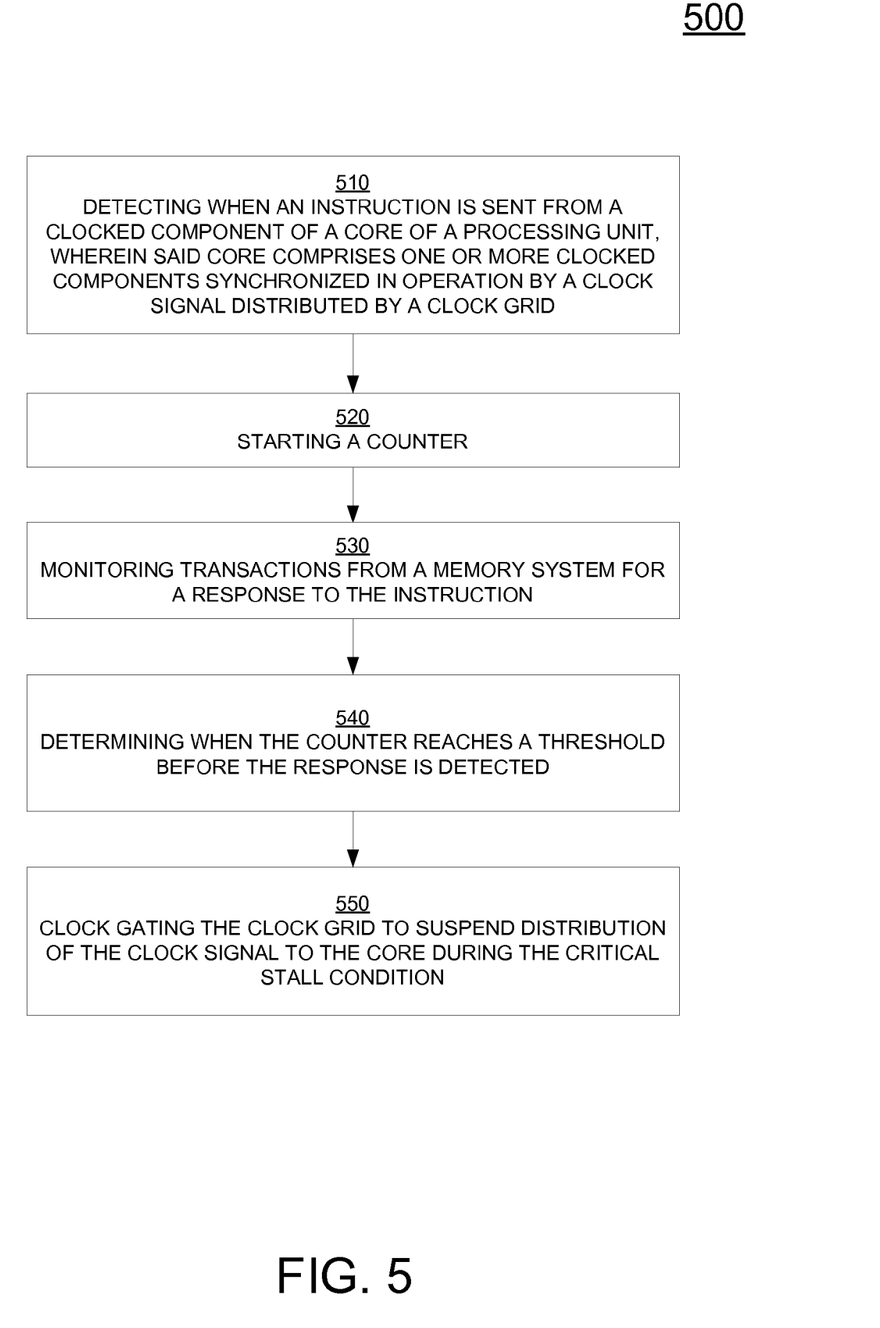
FIG. 5 is a flow diagram illustrating a method for performing power management by clock-gating a clock source to suspend distribution of a clock signal when a counter has reached a threshold after an instruction has been sent and before a response to the instruction has been detected or received, in accordance with one embodiment of the present disclosure.

FIGS. 4 and 5 are flowcharts of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
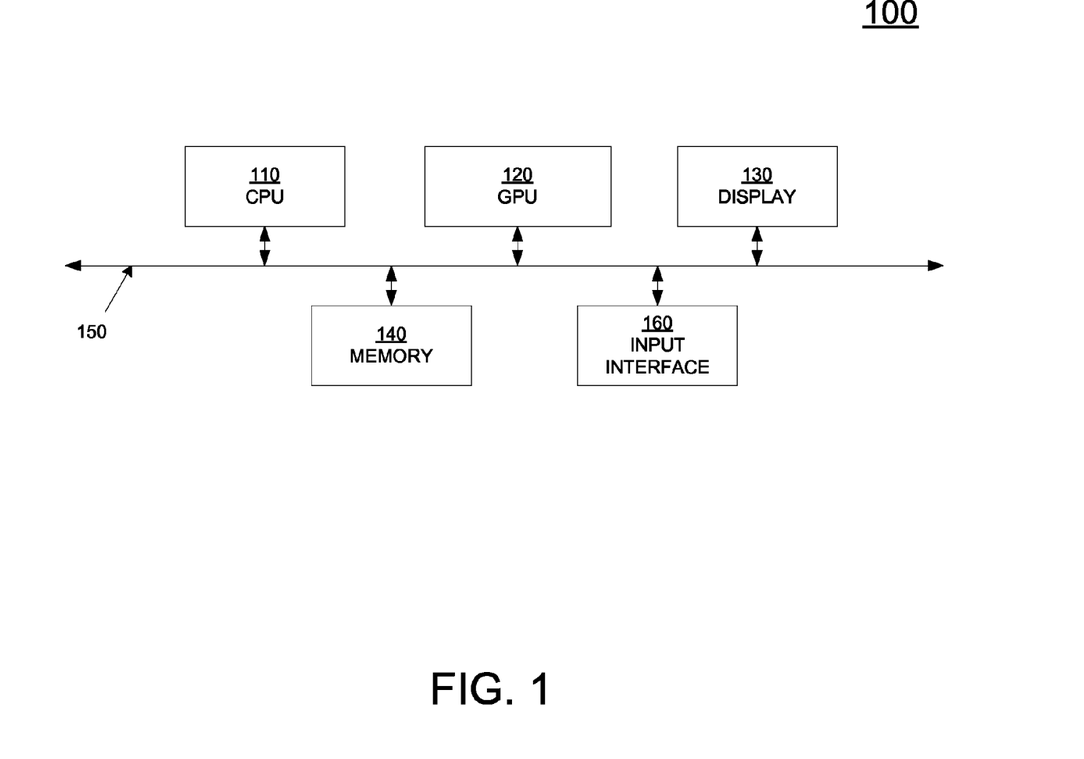
FIG. 1 depicts a block diagram of an exemplary computer system suitable for implementing the present methods in accordance with one embodiment of the present disclosure.

FIG. 1 is a block diagram of an example of a computing system 100 capable of implementing embodiments of the present disclosure. Computing system 10 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device.

The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware.

Figure 2:
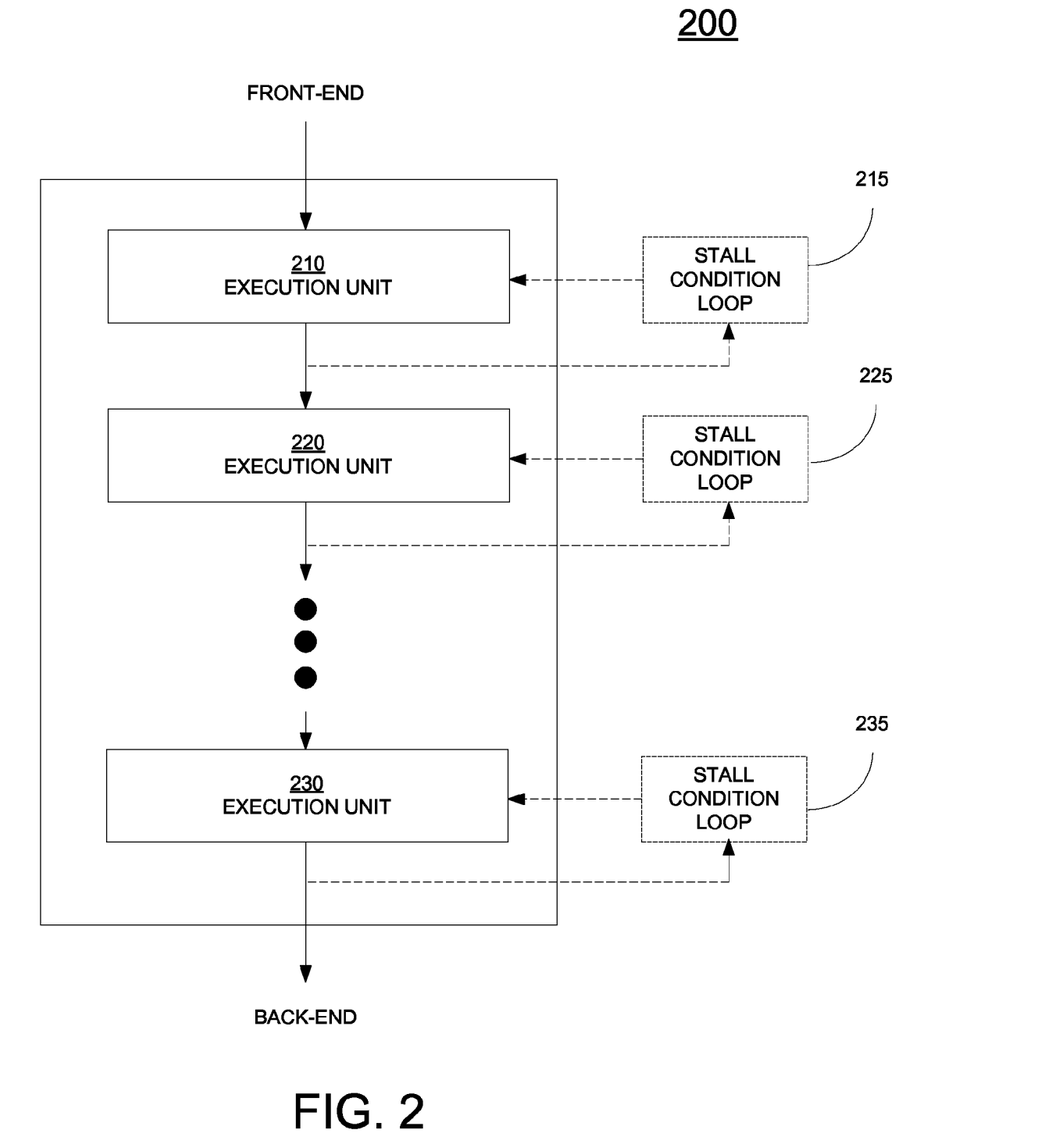
FIG. 2 is a diagram of an exemplary instruction pipeline of an exemplary core of a processor used for processing instructions into a series of dependent steps, in accordance with one embodiment of the present disclosure.

FIG. 2 is a diagram of an exemplary instruction pipeline 200 of an exemplary core of a processor used for processing instructions into a series of dependent steps, in accordance with one embodiment of the present disclosure. The pipeline 200 is configured to execute high level instructions directed to a particular feature or functionality. As shown in FIG. 2, the pipeline 200 shows a single instruction path, though for increased performance, pipeline 200 may include multiple parallel datapaths operating simultaneously.

In general, pipeline 200 includes one or more dependent stages for performing multiple instructions, wherein each stage performs a particular instruction. That is, stages are executed in a specific order, as the output of one stage is input to the following stage. Each instruction and/or stage is executed in one clock cycle. As shown in FIG. 2, stages are represented generally by a corresponding execution unit. For instance, pipeline 200 includes one or more execution units including executing units 210, 220, 230, etc. More particularly, execution 210 is located at the front-end of pipeline 200, and execution unit 230 is located at the back-end of pipeline 200.

At a high level, execution units of pipeline 200 may include, but are not limited to, instruction fetch units (IFUs), instruction decode units, execution units, branch prediction units, arithmetic logic units (ALUs), load store units, memory management units, single instruction, multiple data (SMID) units, and write back units. These execution units performs the operations and/or calculations of the micro-architecture that is designed to perform a particular function.

In addition, execution units may experience a stall condition. For instance, processing in pipeline 200 may be stalled at a specific execution unit, wherein an instruction at the execution unit is unable to be processed during the current clock cycle. As such, while an execution unit is experiencing a stall condition, the pipeline 200 is partly stalled until the corresponding execution unit is able to complete its instructions and resolve its stalled condition. More specifically, pipeline 200 is stalled for stages before the stalled execution unit. As shown in FIG. 2, execution units in a stall condition are represented by a stall condition loop, wherein the instruction is looped back to be processed again by the execution unit. Specifically, execution unit 210 includes a corresponding stall condition loop 215, execution unit 220 includes a corresponding stall condition loop 225, and execution unit 230 includes a corresponding stall condition loop 235.

Stall conditions may vary between micro-architectures. Embodiments of the present invention are configured to monitor for one or more stall conditions experienced by a particular micro-architecture. More particularly, embodiments of the present invention are configured to monitor for one or more critical or dynamic stall conditions. For instance, one critical or dynamic stall condition that triggers a stall in an execution unit of pipeline 200 is a translation lookaside buffer (TLB) miss, wherein a physical address corresponding to a requested virtual address is not located in the TLB cache, and also is not located in a TLB L-2 cache. As such, the translation process must perform a walk-through of a corresponding page table to determine the proper physical address. Another dynamic stall condition that triggers a stall in an execution unit of pipeline 200 is a barrier instruction implemented to enforce an ordering constraint on memory operations and/or to ensure completion of all memory accesses requested before the barrier instruction. During execution of the barrier instruction, the corresponding execution unit stalls pending the completion of the barrier instruction, such as, when waiting for a return or acknowledgment from a very slow memory system. Still another dynamic stall condition that triggers a stall in an execution unit of pipeline 200 is a misprediction of a branch, such as, when the branch prediction misses on a conditional branch, which triggers a flush of the pipeline 200. The stall condition turns into a long-latency miss when the proper instructions or data being fetched are not located in the instruction cache (I-cache, or L-1 cache) present on the chip and are also not located on other off-chip higher-level caches (e.g., L-2 cache), and as such, must go to other lower level caches (e.g., main memory) for the proper information. Another dynamic stall condition that triggers a stall in an execution unit of pipeline 200 is a request for an uncached load, wherein the information must be retrieved, not from cache, but from the main memory system. In one sense, the request for an uncached load is similar to a TLB miss. Still other critical or dynamic stall conditions are contemplated for various micro-architectures that can be identified for purposes of performing clock-gating for power management.

Figure 3:
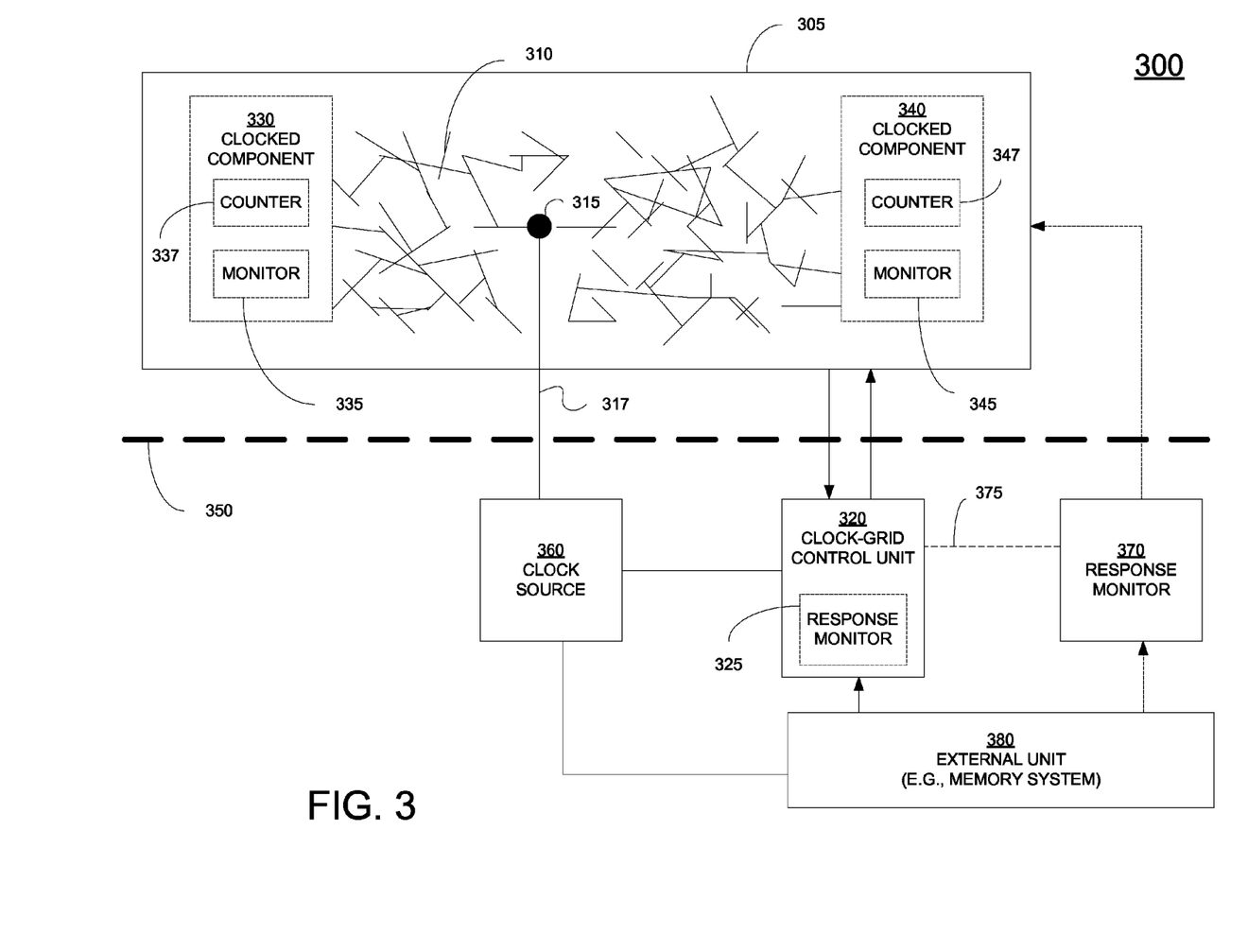
FIG. 3 is a block diagram of an apparatus configured to perform power management by clocking gating a clock source to suspend distribution of a clock signal when a critical stall condition is detected, in accordance with one embodiment of the present disclosure.

FIG. 3 is a block diagram of a micro-architecture 300 of a computing resource that is configured to perform power management by clocking gating a clock source to suspend distribution of a clock signal when a critical stall condition is detected, in accordance with one embodiment of the present disclosure. For instance, micro-architecture 300 is configurable to detect critical stall conditions within the execution of instructions within a pipeline, such as, pipeline 200 of FIG. 2.

As shown in FIG. 3, micro-architecture 300 includes a clock source 360 that is configured to provide a clock signal. For instance, clock source 360 is a phase lock loop (PLL) circuit that generates the clock signal, in one implementation. Additionally, the clock signal is distributed throughout the micro-architecture 300 via a distribution network. For instance, the clock distribution network includes the clock grid 310 used for distributing the clock signal to a core 305 of a processor, wherein the processor may include one or more cores, although only core 305 of the processor is shown in FIG. 3. More particularly, the core 305 includes one or more clocked components (e.g., components 330, 340, etc.), each of which is synchronized in operation by the clock signal that is distributed by the clock grid 315.

Clock grid 315 is representative of any one of a number of distribution network or patterns. In general, the clock grid is configured to distribute a clock signal throughout the core 305 at the same time, such as, in part by minimizing skew of the clock signal as it is being distributed. Examples of clock grids 315 include a binary tree, an H-tree, an X-tree, etc.

As shown in FIG. 3, the clock signal as distributed throughout core 305 is received by one or more clocked components, including clocked component 330 and clocked component 340. Clocked components are configured to perform one or more functions, and in one embodiment are hardware based. In one implementation, clocked component comprises an execution unit, previously introduced in FIG. 2, or a component that is associated with or configured to monitor an execution unit.

For example, in one embodiment, clocked component 330 includes a monitor 335 for detecting a critical stall condition within a clocked component of the core 305. In one implementation, monitor 335 is hardware based and is configured to monitor for a predefined condition or state of the clocked component 330. As an example, monitor 335 is configured to monitor for cache misses, wherein clocked component comprises an L-2 I-cache, and is configured to detect when an instruction is associated with an I-cache miss, and an L-2 I-cache miss, thereby inducing a long-latency period within the pipeline of the core 305.

In another embodiment, clocked component 330 primarily includes and functions as the monitor 335. That is, the monitor 335 is configured to monitor state of another device that is remote from clocked component 330. For instance, monitor 335 may be configured to monitor activity and responses of an execution unit, previously introduced in FIG. 2. Continuing with the example previously provided, monitor 335 may be monitoring the state of a separately located clocked component, such as an L-2 I-cache.

In addition, micro-architecture 300 includes a clock-grid control unit 320 for managing the distribution of the clock signal originating from clock source 360. In particular, clock-grid control unit 320 is electrically coupled to the core 305, and more specifically, to one or more monitors (e.g., monitors 335 and 345) of core 305. As such, clock-grid control unit 320 is able to receive messages from each of the monitors in core 305 instructing the clock-grid control unit 320 to clock-gate the clock grid 310 at a root branch 317 of the clock grid 310. The root branch 317 distributes the clock signal originating from the clock source 360. By gating the root branch 317, the clock-grid control unit 320 is configured to suspend distribution of the clock signal to the core 305 during a critical stall condition that is identified by a corresponding monitor.

As shown in FIG. 3, the clock-grid control unit 320 is not located on the portion of the clock grid 310 supplying a clock signal to the core 305. In particular, the clock-grid control unit 320 is separately gated from the clock source 360, when compared to clock-gating core 305 from clock source 360 via root branch 317. In that manner, even though root branch 317 is clock-gated, the clock-grid control unit 320 is not, and still receives a clock signal from clock source 360. Additionally, clock source 360, clock-grid control unit 320, external unit 370 (e.g., memory system), and response monitors 325 and 370 are located externally from core 305, as shown by demarcation 350.

Also shown in FIG. 3, micro-architecture 300 includes a response monitor for purposes of monitoring responses corresponding to the critical or dynamic stall condition. For instance, response monitor is configured to monitor responses to instructions generated from the stall condition (e.g., accessing a physical address due to a TLB miss), to include accessing information from an external unit 380 (e.g., memory system). More particularly, in one embodiment, the response monitor 325 is located within the clock-grid control unit 320. In another embodiment, response monitor 370 is a stand-alone unit that is separate from the clock-grid control unit 320, and is electrically coupled to the clock-grid control unit 320. In addition, response monitor 325 and 370 are located externally from core 305, wherein they are located on a different branch (e.g., root branch) than the root branch 317 supplying the clock signal to core 305. In that manner, even though the clock signal is gated at root branch 371, the clock signal is not suppressed to the response monitor 325 and/or 370, even though the clock signal is not delivered to core 305. In that manner, once a response is identified as being associated with the critical or dynamic stall condition, the corresponding response monitor is configured to notify the clock-grid control unit 320 to un-clock-gate the clock grid 310 at the root branch 317 of the clock grid 310. As such, when the response returns, the receiving clocked component is powered back on, since the core 305 is again receiving the clock signal.

In one embodiment, response monitor 325 and/or 370 is configured to identify a unique transaction identifier that corresponds to the instruction generated from and/or forcing the stall condition, and the response to that instruction. For instance, the transaction identifier is a memory address. In another instance, the transaction identifier is a multi-bit number generated for the transaction, that typically uses less bits than that required for a memory address. As such, the response monitor is able to monitor in association with the clock-grid control unit responses from the external unit (e.g., memory system) 380 for the transaction identifier. The term "external" used in identifying the external unit 380 indicates the unit 380 is external to core 305, and more specifically is on a different branch (e.g., root branch) than the root branch 317 supplying the clock to core 305. In that manner, even though the clock signal is gated at root branch 371, the clock signal is not suppressed to the external unit 380, even though the clock signal is not delivered to core 305. Once a response is determined to include the transaction identifier, the response monitor (e.g., monitors 325 and 370) is configured to instruct the clock-grid control unit 320 to ungate or un-clock-gate the clock grid to enable the distribution of the clock signal to the core 305 in preparation of receiving the response in the corresponding clocked component (e.g., execution unit) of the core 305.

FIG. 4 is a flow diagram 400 illustrating a method for performing power management by clock-gating a clock source to suspend distribution of a clock signal when a critical stall condition is detected, in accordance with one embodiment of the present disclosure. In one embodiment, the method outlined in flow diagram 400 is implementable within micro-architecture 300 of FIG. 3 that is configured to determine a critical and/or dynamic stall condition and initiate a power management sequence that includes gating a clock source.

At 410, a critical and/or dynamic stall condition is detected in which a long latency period is anticipated. For instance, the hardware based monitor, located within a core of a processor, is configured to monitor for particular state conditions of a hardware device, as previously described (e.g., TLB miss, etc.). The core includes one or more clocked components or hardware devices that are synchronized in operation by a clock signal that is distributed by a clock grid. These clocked components include various units (e.g., IFUs, memory management units, load store units, etc.) that can suffer from long-latency critical stall conditions. The monitors are configured to monitor for those critical and/or dynamic stall conditions within the clocked components. In one embodiment, a monitor is included within the corresponding clocked component that is monitored. In another embodiment, the monitor is external to the corresponding clocked component that is being monitored. Also, the hardware based monitor may include monitors 335 and 345 of FIG. 3, in one implementation.

Critical stall conditions are identified by their long-latency characteristics, as are experienced in one or more micro-architectures. For instance, detecting a critical stall condition may include the detection of one or more of the following conditions: 1) a flush of a pipeline, such as, when a branch mispredict occurs; 2) an I-cache miss; and an L-2 cache miss. In the case of the pipeline flush, the core includes the pipeline, wherein the pipeline includes one or more of the clocked components. In one embodiment, the monitor is located in the I-cache, which is able to detect one or more of the above identified conditions. Other critical stall conditions include, but are not limited to the following: 1) one or more of the following conditions, such as, an I-cache miss and an L-2 cache miss; 2) a TLB miss and an L-2 cache miss; a fetch of an uncached load; and a barrier instruction. In one embodiment, the memory system is configured to inform the monitor when a miss is a long-latency miss (e.g., missing the last level cache).

At 420, the clock grid is clock-gated to suspend distribution of the clock signal to the core during the critical stall condition. That is, power management is achieved by gating the clock signal, such that distribution of the clock signal is prevented throughout the core. As such, clocked components in the core will not draw power, or will minimally draw power.

More particularly, the monitors that are configured to monitor corresponding clocked components are able to inform a clock-grid control unit when to clock-gate the clock grid, such as, after a critical stall is detected. That is, the monitor is able to inform the clock-grid control unit to clock-gate the clock grid at a root branch, based on a pending transaction to an external unit, such as, the memory system. More particularly, the root branch is configured to distribute the clock signal to the core, such that gating the root branch also prevents the clock signal from being distributed throughout the core. In that manner, in the presence of a long-latency miss, or other critical stall condition, to memory that is critical enough the core processor would be performing little or no useful work during the stalled period, the clock grid in association with the core is gated at the root branch. This saves the use of active power by the various idle clocked components, but also the dynamic power of the clock being distributed throughout the clock grid.

The clock-grid control unit is coupled to the external unit (e.g., memory system) providing responses to the pending transaction. In addition, the clock-grid control unit is located on a branch of the clock grid that will not be suspended, and is active throughout the critical stall condition. For instance, a response monitor associated with the clock-grid control unit is configured to monitor responses in the pending transaction stream, and un-clock-gate the clock grid in a timely fashion, such that the corresponding response reaches the corresponding clocked component in the grid that properly active through the distribution of the clock signal. Coordinated timing of un-clock-gating the clock grid is particularly important in a synchronous interface between the memory and the core, such that the clock grid is un-clock-gated before the response is delivered to the core. More particularly, once the response is identified by the response monitor and/or the clock-grid control unit, an instruction is sent to the clock-gate control unit to un-clock-gate the clock grid (e.g., un-clock-gate the root branch).

In one embodiment, the response is identified through the use of a transaction identifier. In particular, a transaction identifier is generated in association with the pending transaction, such as, an instruction forcing the critical stall condition. As an example, the instruction may be one to retrieve the proper data or instruction in the case of a misprediction. During the critical stall condition, responses from memory are monitored by the response monitor in association with the clock-grid control unit. Specifically, the responses are monitored to identify when the response with the transaction identifier is returned. When it is determined that a response with the proper transaction identifier has been returned from the memory system, the clock grid is un-clock-gated to enable distribution of the clock signal to the core in time for the response to be received by the proper clocked component that is now active.

In embodiments of the present invention, the clock grid is temporarily un-clock-gated to temporarily enable distribution of the clock signal to the core for processing selected incoming transactions directed to the core. For instance, the clock-grid control unit is configured to exit the automatic power-managed state when the response is received, as previously described, but is also configured to temporarily re-enable the clock grid to process incoming requests. For instance, the clock grid is temporarily re-enabled to handle coherence snoops, and to accept responses to non-critical transactions that were outstanding at the time the clock grid was gated (e.g., outstanding pre-fetches).

FIG. 5 is a flow diagram 500 illustrating a method for performing power management by clock-gating a clock source to suspend distribution of a clock signal when a counter has reached a threshold after an instruction has been sent and before a response to the instruction has been detected or received, in accordance with one embodiment of the present disclosure. In one embodiment, the method outlined in flow diagram 500 is implementable within micro-architecture 300 of FIG. 3 that is configured to determine a critical and/or dynamic stall condition and initiate a power management sequence that includes gating a clock source.

At 510, the method includes detecting when an instruction is sent from a clocked component of a core of a processing unit, wherein the instruction is related to a pending transaction. The core includes one or more clocked components or hardware devices that are synchronized in operation by a clock signal that is distributed by a clock grid. These clocked components include various units (e.g., IFUs, memory management units, load store units, etc.) that can suffer from long-latency critical stall conditions. The instruction detected may be predefined, or within a group of instructions that are selected for detection within the clocked component, all of which are known to be susceptible at one point to long latency stalls, in one embodiment. In other embodiments, the instruction may be any instruction originating from the clocked component. That is, any instruction is presumed to be susceptible to long latency stalls, and is subject to consideration for clock-gating the clock source for purposes of power management.

In one embodiment, the instruction is detected by a hardware based monitor, located within the core processor, and is configured to monitor for generic or specific instructions. For instance, the monitors are configured to monitor for the instruction related to pending transactions associated with the clocked components in the processor core. In one embodiment, a monitor is included within the corresponding clocked component that is monitored, such as, monitor 335 of clocked component 330, and monitor 345 of clocked component 340. In another embodiment, the monitor is external to the corresponding clocked component that is being monitored.

When the instruction is detected, at 520, a counter is started. The counter gives an indication whether the instruction and any responses associated with the instruction is characteristic of a critical or dynamic stall condition. The counter is incremented at each new clock cycle. In one embodiment, the counter is included within the corresponding clocked component that is monitored, such as, counter 337 of component 330, and counter 347 of component 340. In another embodiment, the counter is external to the corresponding clocked component that is being monitored. In still other embodiments, the counter is included within the corresponding monitor, or is external to the corresponding monitor.

At 530, transactions related to the instruction are monitored. For instance, a transaction and/or response monitor that is coupled to the counter is configured to monitor transactions and responses related to the instruction in the pending transaction stream. In another embodiment, the monitoring is implemented outside of the core such that monitoring of transactions (e.g., responses) can occur even though the core has been clock-gated for purposes of power management. That is, the transaction or response monitor is located on a branch of the clock grid that is not suspended when the root branch supplying a clock signal to the core has been gated. In addition, the transaction or response monitor is configured to monitor transactions and responses in the pending transaction stream. In one embodiment, the transaction or response monitor is coupled to a memory system for purposes of monitoring transaction and responses in the pending transaction stream.

At 540, the counter is able to determine when it reaches a threshold before a transaction or response related to the instruction in the pending transaction stream is detected. That is, when the counter reaches the threshold, it is highly likely that the pending transaction stream is experiencing a critical and/or dynamic stall condition. On the other hand, if a transaction or response related to the instruction in the pending transaction stream is detected before the counter reaches a threshold, then the counter is reset for use in association with another detected instruction. That is, the micro-architecture, or rather the clocked component of the micro-architecture, is not currently experiencing a critical and/or dynamic stall condition under the pending transaction stream At 550, when the counter reaches a threshold before a transaction or response related to the instruction is detected, power management techniques are employed by clock-gating the clock grid at a root branch to suspend distribution of the clock signal to the core during the critical stall condition. In other words, power management is achieved by gating the clock signal, such that distribution of the clock signal is prevented throughout the core. In this case, clocked components in the core will not draw power or will minimally draw power. More particularly, the counter is configured to inform a clock-grid control unit when to clock-gate the clock grid at the root branch, such as, when the counter reaches the threshold. As such, in the presence of the critical stall condition, the core processor would be performing little or no useful work during the stalled period since the use of active power is minimized by the various idle clocked components in the core, and also by gating the use of dynamic power related to the clock signal being distributed throughout the clock grid.

As previously described, the clock-grid control unit is coupled to the external unit (e.g., memory system) providing transactions and responses to the pending transaction related to the instruction. In addition, the clock-grid control unit is located on a branch of the clock grid that will not be suspended, and is active throughout the critical stall condition. In addition, the transaction and response monitor is similarly configured, such that it is located on a branch of the clock grid that is not suspended, and is active throughput the critical stall period. As such, once a transaction or response related to the instruction in the pending transaction stream is detected, the monitor is configured to instruct the clock-grid control unit to un-clock-gate the clock grid (e.g., un-clock-gate the root branch) in a timely fashion. In that manner, the core processor is active before the corresponding transaction or response reaches the corresponding clocked component in the grid. Coordinated timing of un-clock-gating the clock grid is particularly important in a synchronous interface between the memory and the core, such that the clock grid is un-clock-gated before the response is delivered to the core.

In one embodiment, the transaction or response related to the instruction in the pending transaction stream is identified through the use of a transaction identifier. In particular, a transaction identifier is generated in association with the pending transaction, such as, in relation to the instruction forcing the critical stall condition. During the critical stall condition, transactions and responses from memory or any other external unit are monitored by the response monitor in association with the clock-grid control unit. Specifically, the responses are monitored to identify when the transaction or response with the same transaction identifier is detected.

Thus, according to embodiments of the present disclosure, systems and methods are described in which a clock grid is automatically gated at a root branch for purposes of power management to a core of a processor under identified critical and dynamic stall conditions. Embodiments of the present invention include the determination that a core of a micro-architecture is in the presence of a critical and/or dynamic stall condition, and initiate a power management sequence automatically/autonomously.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A method for power management, comprising:
   detecting a critical stall condition within a clocked component of a core of a processing unit, wherein said core comprises one or more clocked components synchronized in operation by a clock signal distributed by a clock grid;
   clock-gating said clock grid to suspend distribution of said clock signal to said core during said critical stall condition; and
   temporarily un-clock-gating said clock grid to temporarily enable distribution of said clock signal core for processing selected incoming transactions directed to said core.

2. The method of claim 1, wherein said detecting comprises:
   detecting said critical stall condition at a hardware based monitor, wherein said clocked component comprises said hardware based monitor.

3. The method of claim 2, wherein said detecting a critical stall condition comprises:
   detecting at said monitor a flush of a pipeline, wherein said core comprises said pipeline comprising one or more of said clocked components, and wherein said clocked component comprises an I-cache;
   detecting an I-cache miss; and
   detecting an L-2 miss.

4. The method of claim 1, wherein said clock-gating comprises:
   gating said clock signal at a root branch of said clock grid, wherein said root branch distributes said clock signal to said core.

5. The method of claim 1, wherein said clock-gating comprises:
   sending an instruction to a clock control unit to clock-gate said clock signal, wherein said clock control unit is located on a branch of said clock grid that is not suspended.

6. The method of claim 5, further comprising:
   determining a transaction identifier of an instruction forcing said critical stall condition;
   monitoring in association with said clock-grid control unit responses from memory for said transaction identifier;
   determining a response includes said transaction identifier; and
   un-clock-gating said clock grid to enable distribution of said clock signal to said core.

7. The method of claim 6, wherein said un-clock-gating said clock grid further comprises:
   in a synchronous interface between said memory and said core, un-clock-gating said clock grid before said response is delivered to said core.

8. The method of claim 1, wherein said critical stall condition is taken from a group consisting essentially of:
   a pipeline flush, an I-cache miss, and an L-2 cache miss;
   a cached data load miss in L1 cache and L2 cache;
   a TLB miss and an L-2 cache miss;
   a fetch of an uncached load; and
   a barrier instruction.

9. The method of claim 1, wherein said clocked component is taken from a group consisting essentially of:
   a load store unit,
   an instruction fetch unit; and
   memory management unit.

10. A method for power management, comprising:
    detecting when an instruction is sent from a clocked component of a core of a processing unit, wherein said core comprises one or more clocked components synchronized in operation by a clock signal distributed by a clock grid;
    starting a counter;
    monitoring transactions from a memory system for a response to said instruction;
    determining when said counter reaches a threshold before said response is detected thereby detecting a critical stall condition; and
    clock-gating said clock grid to suspend distribution of said clock signal to said core during said critical stall condition.

11. The method of claim 10, further comprising:
    resetting said counter when receiving said response before said counter reaches said threshold.

12. The method of claim 10, wherein said clock-gating comprises:
    gating said clock signal at a root branch of said clock grid, wherein said root branch distributes said clock signal to said core.

13. The method of claim 10, wherein said clock-gating comprises:
    sending an instruction to a clock control unit to clock-gate said clock signal, wherein said clock control unit is located on a branch of said clock grid that is not suspended.

14. The method of claim 13, further comprising:
    determining a transaction identifier of said instruction;
    detecting said response;
    detecting said transaction identifier in said response; and
    un-clock-gating said clock grid to enable distribution of said clock signal to said core.

15. The method of claim 10, further comprising:
temporarily un-clock-gating said clock grid to temporarily enable distribution of said clock signal to said core for processing selected incoming transactions directed to said core.

16. An apparatus for power management, comprising:
a clock source providing a clock signal;
a clock grid;
a core of a processing unit, wherein said core comprises one or more clocked components synchronized in operation by said clock signal distributed by said clock grid;
a hardware based monitor for detecting a critical stall condition within a clocked component of said core, wherein said clocked component comprises said hardware based monitor; and
a clock-grid control unit for clock-gating said clock grid at a root branch of said clock grid to suspend distribution of said clock signal to said core during said critical stall condition, wherein said root branch distributes said clock signal to said core, wherein said clock-grid control unit is configured to perform the following operations:
determining a transaction identifier of an instruction forcing said critical stall condition;
monitoring in association with said clock-grid control unit responses from memory for said transaction identifier;
determining a response includes said transaction identifier; and
un-clock-gating said clock grid to enable distribution of said clock signal to said core.

17. The apparatus of claim 16 wherein said clock source comprises a phase lock loop circuit, and wherein said clock-grid control unit is located on a different branch than said root branch.

18. The method of claim 16, wherein said clocked component is taken from a group consisting essentially of:
a load store unit,
an instruction fetch unit; and
memory management unit.

\* \* \* \* \*